United States Patent
Chung et al.

(10) Patent No.: US 11,767,022 B2
(45) Date of Patent: Sep. 26, 2023

(54) APPARATUS FOR CONTROLLING AUGMENTED REALITY, METHOD OF IMPLEMENTING AUGMENTED REALITY BY USING THE APPARATUS, AND SYSTEM OF IMPLEMENTING AUGMENTED REALITY BY INCLUDING THE APPARATUS

(71) Applicant: SAMSUNG ELECTRONICS CO., LTD., Suwon-si (KR)

(72) Inventors: Jaeseung Chung, Suwon-si (KR); Sunil Kim, Seoul (KR); Yuntae Kim, Suwon-si (KR); Wontaek Seo, Yongin-si (KR); Juwon Seo, Osan-si (KR); Geeyoung Sung, Daegu (KR); Bongsu Shin, Seoul (KR); Changkun Lee, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 714 days.

(21) Appl. No.: 16/403,892

(22) Filed: May 6, 2019

(65) Prior Publication Data
US 2020/0156655 A1    May 21, 2020

(30) Foreign Application Priority Data
Nov. 16, 2018   (KR) .................. 10-2018-0141956

(51) Int. Cl.
| | |
|---|---|
| B60W 50/14 | (2020.01) |
| G06F 3/01 | (2006.01) |
| G02B 27/01 | (2006.01) |
| G06T 7/73 | (2017.01) |
| G06V 40/16 | (2022.01) |

(52) U.S. Cl.
CPC ......... B60W 50/14 (2013.01); G02B 27/0172 (2013.01); G06F 3/017 (2013.01); G06T 7/73 (2017.01); G06V 40/166 (2022.01); B60W 2050/146 (2013.01); G02B 2027/014 (2013.01);
(Continued)

(58) Field of Classification Search
CPC ...... B60W 50/14; G06T 7/73; G02B 27/0172; G06F 3/017; G06K 9/00255
See application file for complete search history.

(56) References Cited

U.S. PATENT DOCUMENTS

| | | | |
|---|---|---|---|
| 8,872,901 B2 | 10/2014 | Kwon et al. | |
| 9,075,563 B2 | 7/2015 | Kim | |

(Continued)

FOREIGN PATENT DOCUMENTS

| | | |
|---|---|---|
| KR | 10-2012-0005328 A | 1/2012 |
| KR | 10-2015-0014284 A | 2/2015 |
| KR | 10-2015-0051671 A | 5/2015 |

OTHER PUBLICATIONS

Mine, Mark R. "Characterization of end-to-end delays in head-mounted display systems." The University of North Carolina at Chapel Hill, TR93-001 (1993).*

*Primary Examiner* — Sarah Lhymn
(74) *Attorney, Agent, or Firm* — Sughrue Mion, PLLC

(57) ABSTRACT

An apparatus for controlling an augmented reality includes: a communicator configured to communicate with an external device; and a processor configured to identify, via the communicator, a sensing device which is an external device, generate virtual image data based on sensing data received from the identified sensing device, and provide the virtual image data to an image display device.

21 Claims, 12 Drawing Sheets

(52) U.S. Cl.
CPC ........... *G02B 2027/0138* (2013.01); *G02B 2027/0141* (2013.01); *G02B 2027/0178* (2013.01)

(56) References Cited

U.S. PATENT DOCUMENTS

| | | | |
|---|---|---|---|
| 9,881,503 B1* | 1/2018 | Goldman-Shenhar | ........................ G08G 1/005 |
| 9,927,614 B2 | 3/2018 | Vallius | |
| 10,534,954 B2* | 1/2020 | Kaehler | ............... G06V 40/172 |
| 2012/0154441 A1* | 6/2012 | Kim | ........................ G06F 3/147 |
| | | | 345/633 |
| 2013/0258486 A1* | 10/2013 | Ionescu | .............. G02B 27/0172 |
| | | | 359/630 |
| 2015/0097860 A1* | 4/2015 | Alaniz | ................. G02B 27/017 |
| | | | 345/633 |
| 2015/0202962 A1* | 7/2015 | Habashima | ............ B60K 35/00 |
| | | | 345/633 |
| 2016/0207539 A1* | 7/2016 | Jung | ..................... G02B 27/017 |
| 2017/0013188 A1* | 1/2017 | Kothari | .................... B60R 1/00 |
| 2017/0187963 A1* | 6/2017 | Lee | ........................ G06V 20/56 |
| 2017/0228938 A1 | 8/2017 | Fateh | |
| 2017/0287217 A1* | 10/2017 | Kim | ...................... G08G 1/166 |
| 2017/0313248 A1* | 11/2017 | Kothari | .................... B60R 1/00 |
| 2018/0107000 A1 | 4/2018 | Sung et al. | |
| 2019/0025588 A1* | 1/2019 | Osterhout | ............ H04N 13/383 |
| 2019/0073098 A1* | 3/2019 | Fu | ........................ G06F 3/0485 |
| 2019/0101977 A1* | 4/2019 | Armstrong-Muntner | ................... G06N 20/00 |
| 2020/0093014 A1* | 3/2020 | Merenda | ............. H05K 5/0217 |
| 2020/0104966 A1* | 4/2020 | Cella | ........................ G06N 3/08 |

* cited by examiner

APPARATUS FOR CONTROLLING AUGMENTED REALITY, METHOD OF IMPLEMENTING AUGMENTED REALITY BY USING THE APPARATUS, AND SYSTEM OF IMPLEMENTING AUGMENTED REALITY BY INCLUDING THE APPARATUS

CROSS-REFERENCE TO RELATED APPLICATION

This application is based on and claims priority from Korean Patent Application No. 10-2018-141956, filed on Nov. 16, 2018, in the Korean Intellectual Property Office, the disclosure of which is incorporated herein in its entirety by reference.

BACKGROUND

1. Field

The disclosure relates to apparatuses for controlling augmented reality, methods of implementing an augmented reality by using the apparatuses, and systems of implementing an augmented reality by including the apparatuses.

2. Description of the Related Art

As electronic devices and display devices capable of implementing virtual reality (VR) have recently been developed, interest in these devices is rising. As a next step of VR, techniques realizing augmented reality (VR) and mixed reality (MR) are also under development.

AR is a display technique that combines virtual objects or information on the environment of the real world. AR is applicable to various real environments. In particular, AR is drawing attention as a next-generation display technology suitable for a ubiquitous environment or an internet of things (IoT) environment.

An AR glasses-type device allows an individual user to experience a new experience that has never been experienced before, by expressing a virtual image and combining an external foreground to the virtual image. The AR glasses-type device may function as an independent device for each individual, and may also operate as an information transfer medium to share an individual's experience among users wearing a glasses-type device. The glasses-type device may be used as a tool to create a new value in many aspects of human life through the feature of the glasses-type device allowing real-time interaction with other people.

SUMMARY

Provided are apparatuses for controlling an augmented reality (AR), a method of implementing an AR, and a system for implementing an AR, whereby a level of immersion may be increased.

Provided are apparatuses for controlling an AR having improved optical characteristics.

Provided are apparatuses for controlling an AR, a method of implementing an AR, and a system for implementing an AR, whereby the usability and safety of user are improved.

Provided are image display devices that are compact and lightweight.

Additional aspects will be set forth in part in the description which follows and, in part, will be apparent from the description, or may be learned by practice of the embodiments of the disclosure.

According to an aspect of the disclosure, there is provided an apparatus for controlling an augmented reality, the apparatus comprising: a communicator configured to communicate with an external device; and a processor configured to: identify a sensing device external to the apparatus, generate virtual image data based on sensing data received, via the communicator, from the identified sensing device, and provide the virtual image data to an image display device.

The processor maybe further configured to: receive an identification signal from the sensing device via the communicator; and identify the sensing device based on the identification signal.

The sensing data may comprise image data about an area including a face of a user.

The processor maybe further configured to extract information about a position and a direction of the face of the user from the sensing data.

The image display device maybe configured to output a virtual image, and the processor maybe further configured to generate the virtual image data such that the image display device outputs the virtual image matching an actual image, wherein the actual image maybe based on actual image data received, via the communicator, from a photographing devices external to the apparatus.

The virtual image may have a position fixed on the actual image.

The image display device maybe configured to output the virtual image, wherein the sensing data may include gesture information about a gesture of a user, and wherein the processor maybe further configured to: control a vehicle such that a function corresponding to the gesture is performed, and generate the virtual image data such that the image display device outputs the virtual image corresponding to the function.

The virtual image maybe independent of the actual image.

The image display device may comprise a glasses-type device.

The image display device maybe configured to output virtual images located at a plurality of focal lengths.

According to another aspect of the disclosure, there is provided a method of implementing an augmented reality by an augmented reality controlling apparatus, the method comprising: identifying a sensing device external to the augmented reality controlling apparatus; generating virtual image data based on sensing data received from the identified sensing device; and providing the virtual image data to an image display device.

The identifying of the sensing device may comprises: receiving, by using the augmented reality controlling apparatus, an identification signal from the sensing device; and identifying the sensing device based on the identification signal.

A virtual image corresponding to the virtual image data maybe matched to an actual image.

The generating of the virtual image data may comprise: extracting information about a position and a direction of a face of a user from the sensing data; obtaining actual image data; and matching the virtual image to the actual image based on the information about the position and the direction of the face and the actual image data.

An virtual image corresponding to the virtual image data maybe independent of an actual image.

The sensing data may include gesture information about a gesture of a user, and wherein the virtual image may correspond to the gesture information.

According to another aspect of the disclosure, there is provided a system for implementing an augmented reality, the system comprising: a sensing device configured to generate sensing data; an augmented reality controlling apparatus configured to generate virtual image data by processing the sensing data; and an image display device configured to output a virtual image based on the virtual image data, wherein the image display device comprises a glasses-type device, and the sensing device and the augmented reality controlling apparatus are external to the image display device.

The system may further comprise: an external photographing apparatus generating actual image data by capturing an image of an actual object, wherein the external photographing apparatus is external to the image display device.

The augmented reality controlling apparatus may comprise a mobile portable device and receives an identification signal from the sensing device to identify the sensing device.

The augmented reality controlling apparatus maybe embedded in a vehicle.

According to another aspect of the disclosure, there is provided an apparatus for controlling an augmented reality, the apparatus comprising: a communicator; a memory configured to store one or more instructions; and a processor configured to execute the one or more instructions to: receive sensing data from a sensing device via the communicator; generate virtual image data based on the received sensing data, and provide the virtual image data to an image display device to display a virtual image based on the virtual image data, wherein at least one of the sensing device and the image display device are external to the apparatus.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
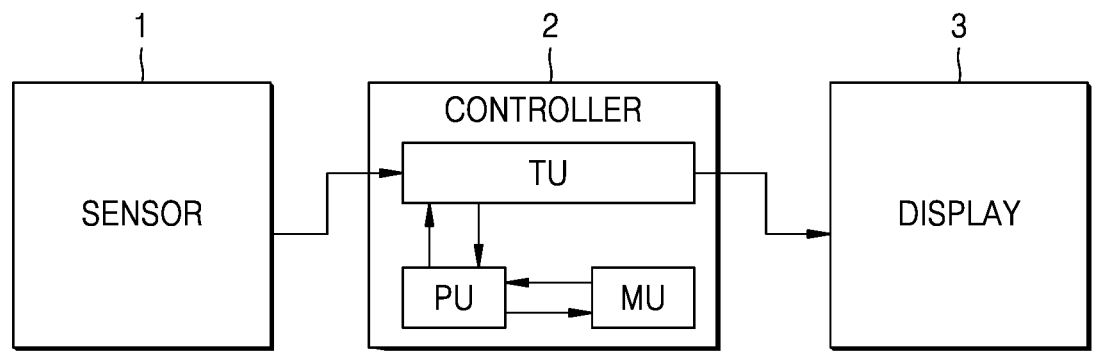
FIG. 1 is a block diagram of a system for implementing an augmented reality according to an embodiment.

Reference will now be made in detail to embodiments, examples of which are illustrated in the accompanying drawings. In the drawings, like reference numerals refer to like elements throughout and sizes of constituent elements may be exaggerated for convenience of explanation and the clarity of the specification. In this regard, the embodiments may have different forms and should not be construed as being limited to the descriptions set forth herein. As used herein, the term "and/or" includes any and all combinations of one or more of the associated listed items.

It will also be understood that when an element is referred to as being "on" or "above" another element, the element may be in direct contact with the other element or other intervening elements may be present.

In the following embodiments, the singular forms include the plural forms unless the context clearly indicates otherwise. It should be understood that, when a part "comprises" or "includes" an element in the specification, unless otherwise defined, other elements are not excluded from the part and the part may further include other elements.

Also, in the specification, the term "units" or " . . . modules" denote units or modules that process at least one function or operation, and may be realized by hardware, software, or a combination of hardware and software.

FIG. 1 is a block diagram of a system 10 for implementing augmented reality (AR), according to an embodiment.

Referring to FIG. 1, the system 10 for implementing an augmented reality, including a sensor 1, a controller 2, and an image display 3 may be provided. The sensor 1 may sense a user (not shown) of the system 10 and generate sensing data. The user may be, for example, a driver of a vehicle. The sensor 1 may be provided outside the image display 3. That is, the sensor 1 may be apart from the image display 3. In some embodiments, the sensor 1 may generate image data about a user of the system 10 for implementing an augmented reality. The image data may include image data about a face of a user. For example, the sensor 1 may include an image capturing device including an image sensor. In some embodiments, the sensor 1 may sense a gesture of a user of the system 10 for implementing an augmented reality. For example, the sensor 1 may include a gesture sensor. The sensor 1 may provide sensing data to the controller 2.

The controller 2 may generate virtual image data by using sensing data. For example, virtual image data may include data about an image of a direction guide indicator, which is matched to an actual roadway image, a price image matched to an image of an actual gas station and/or an image of a volume control in a vehicle.

In some embodiments, the controller 2 may include a communicator TU that communicates with an external device, a processor PU, and a memory MU. The communicator TU may receive sensing data from the sensor 1 in a wired or wireless manner. The communicator TU may provide the sensing data to the processor PU. The processor PU may generate virtual image data based on the sensing data. For example, the processor PU may generate virtual image data such that a virtual image matching an actual image is output. The actual image may be obtained using an external photographing apparatus (not shown). According to another embodiment, the processor PU may generate virtual image data such that an independent virtual image is output from an actual image. The processor PU may process sensing data by using software components stored in the memory MU. For example, the memory MU is a computer-readable recording medium, and may include a permanent mass storage device such as random access memory (RAM), read only memory (ROM), and a disk drive. The processor PU may provide virtual image data to the communicator TU. The communicator TU may transmit virtual image data to the image display 3 in a wired or wireless manner.

The image display 3 may output a virtual image based on virtual image data. In some embodiments, the image display 3 may be a glasses-type device including an optical coupler (not shown). The optical coupler may include a see-through type display placed in front of the eyes of a user. An actual image may pass through an optical coupler, and a virtual image may be output to the optical coupler. A user may view an image in which an actual image and a virtual image are combined.

In some embodiments, a virtual image may be matched to an actual image. For example, a virtual image may be fixed at a certain position on an actual image. Accordingly, a user may observe the virtual image when the particular position is placed within a field of view of the user that is viewable by using the optical coupler. For example, an actual image may be an image of an actual road, and a virtual image may be an image of a direction indicator. For example, an actual image may be an image of an actual gas station, and a virtual image may include an image of oil prices.

In some embodiments, a virtual image may be independent of an actual image. For example, a virtual image may be fixed at a particular position on an optical coupler. For example, a virtual image may be a volume control image output at an upper end of an optical coupler.

Figure 2:
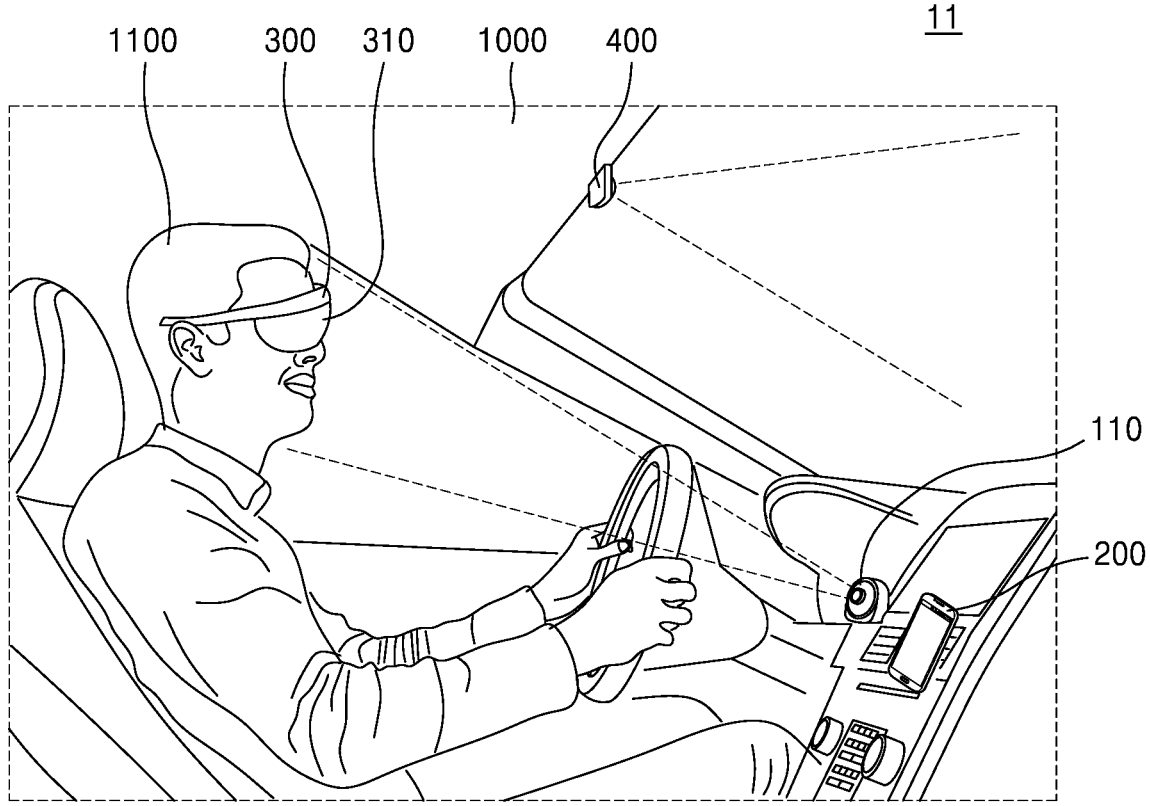
FIG. 2 is a conceptual diagram of a system for implementing an augmented reality according to an embodiment.
Figure 3:
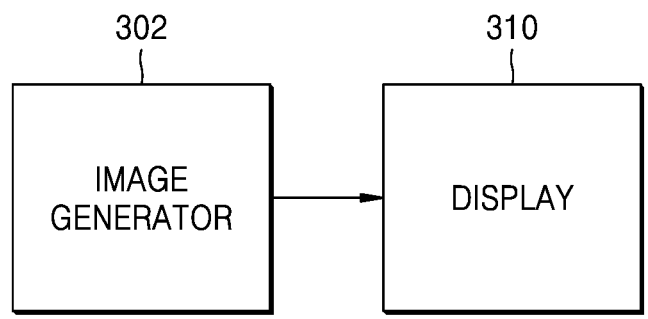
FIG. 3 is a block diagram for describing an image display device according to an embodiment.
Figure 4:
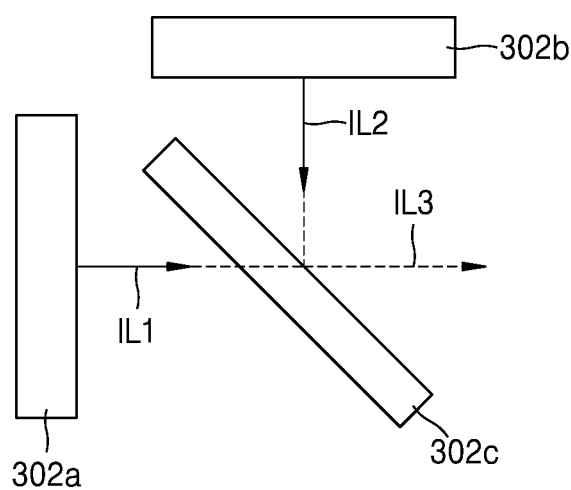
FIG. 4 is a conceptual diagram of an image generator according to an embodiment.
Figure 5:
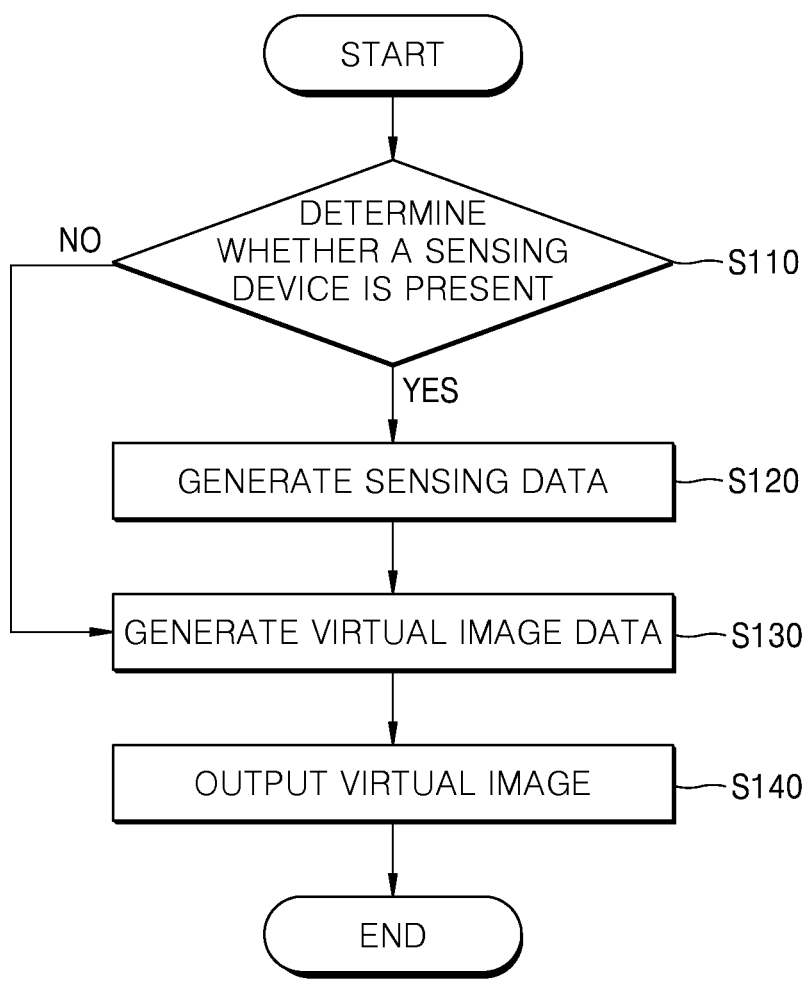
FIG. 5 is a flowchart of a method of implementing an augmented reality according to an embodiment.
Figure 6:
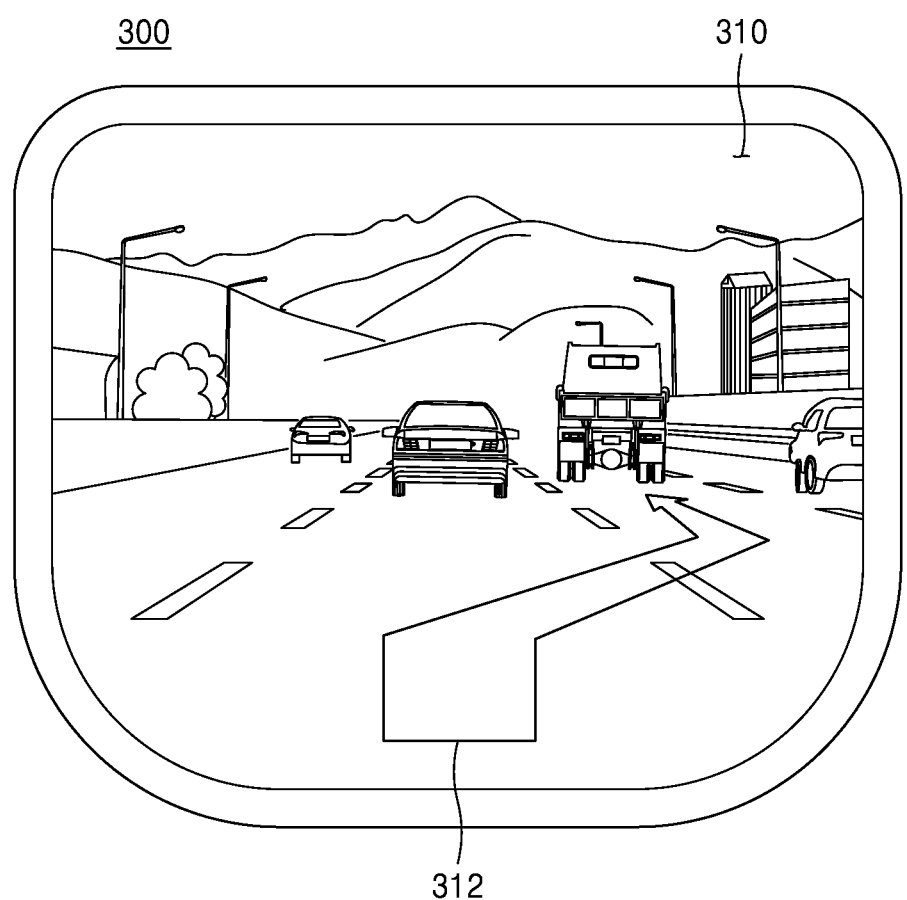
FIGS. 6 and 7 are conceptual diagrams of implementation of an augmented reality, for describing matching between a virtual image and an actual image.
Figure 7:
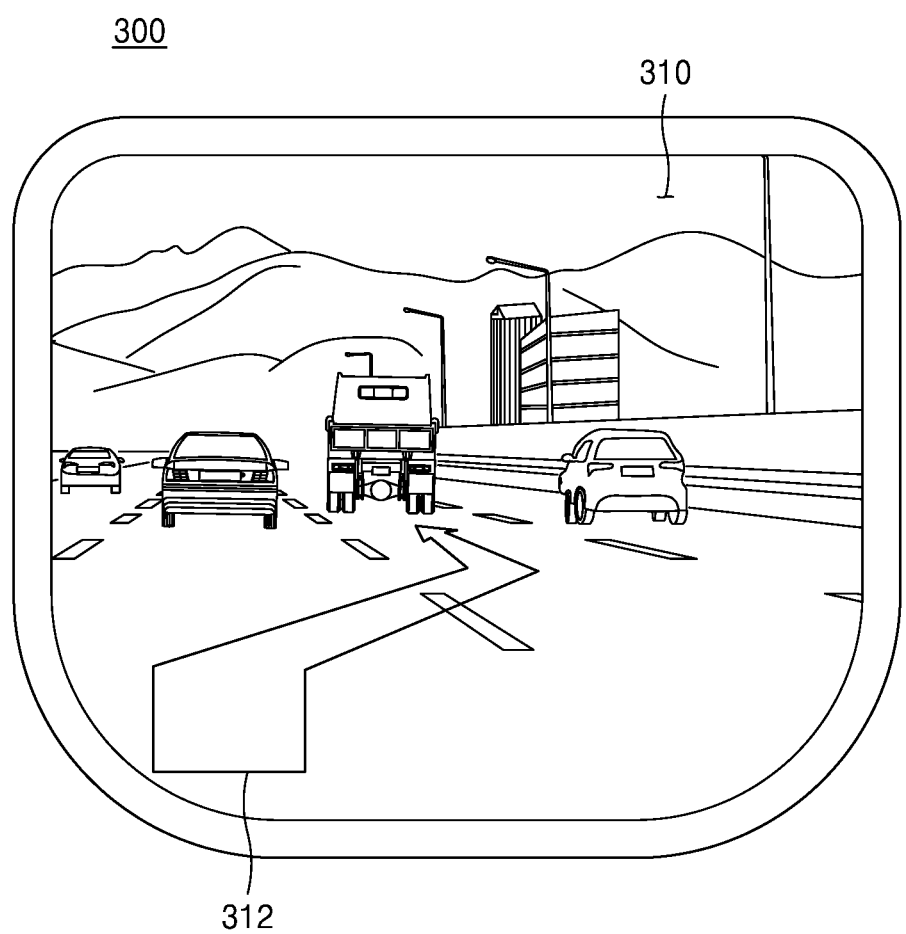

FIG. 2 is a conceptual diagram of a system 11 for implementing an augmented reality (AR), according to an embodiment. FIG. 3 is a block diagram for describing an image display device according to an embodiment. FIG. 4 is a conceptual diagram of an image generator according to an embodiment. FIG. 5 is a flowchart of a method of implementing an augmented reality, according to an embodiment. FIGS. 6 and 7 are conceptual diagrams of implementation of an augmented reality, for describing matching between a virtual image and an actual image. For brevity, descriptions that are substantially identical to those provided with reference to FIG. 1 are omitted.

Referring to FIGS. 2 through 4, the system 11 for implementing an augmented realty, including a first sensing device 110, an augmented reality controlling apparatus 200, an image display device 300, and an external photographing apparatus 400 in a vehicle 1000 may be provided. The first sensing device 110, the augmented reality controlling apparatus 200, and the image display device 300 may respectively correspond to the sensor 1 (of FIG. 1), the controller 2 (of FIG. 1), and the image display 3 (of FIG. 1) described above with reference to FIG. 1.

The first sensing device 110 may generate sensing data by capturing an image of an area including a face of the user 1100 of the system 11 for implementing an augmented reality. In some embodiments, the user 1100 may be a driver of the vehicle 1000. For example, the first sensing device 110 may include an image capturing device including an image sensor. Sensing data may be image data about a face of the user 1100. The first sensing device 110 may be provided outside the image display device 300. For example, the first sensing device 110 may be arranged inside a vehicle but may be apart from the image display device 300. The first sensing device 110 may be connected to the augmented reality controlling apparatus 200 in a wired or wireless manner and provide sensing data to the augmented reality controlling apparatus 200. While one first sensing device 110 is illustrated, this is an example. The position of the first sensing device 110 and the number of first sensing devices 110 may be determined according to necessity. As the first sensing device 110 is separately arranged outside the image display device 300, the image display device 300 may be compact and lightweight.

The external photographing apparatus 400 may obtain actual image data by capturing an image of an actual object. An actual object may include a road, a building, or a sign outside the vehicle 1000. For example, the external photographing apparatus 400 may be an image capturing device including an image sensor. The external photographing apparatus 400 may be provided outside the image display device 300. For example, the external photographing apparatus 400 may be included in a vehicle but may be apart from the image display device 300. The external photographing apparatus 400 may be connected to the augmented reality controlling apparatus 200 in a wired or wireless manner and provide actual image data to the augmented reality controlling apparatus 200. While one external photographing apparatus 400 is illustrated, this is an example. The position of the first sensing device 110 and the number of first sensing devices 110 may be determined according to necessity. As the first sensing device 110 is separately arranged outside the image display device 300, the image display device 300 may be compact and lightweight.

The augmented reality controlling apparatus 200 may generate virtual image data based on sensing data and actual image data. For example, the augmented reality controlling apparatus 200 may generate virtual image data, by using information about a position and a direction of a face of the user 1100, such that a virtual image and an actual image are matched. The augmented reality controlling apparatus 200 may include the communicator TU (of FIG. 1), the processor PU (of FIG. 1), and the memory MU (of FIG. 1). The augmented reality controlling apparatus 200 may be connected to the image display device 300 in a wired or wireless manner and transmit virtual image data to the image display device 300. The augmented reality controlling apparatus 200 may be provided outside the image display device 300. For example, the augmented reality controlling apparatus 200 may include a mobile portable device (for example, a smartphone or a smartwatch). As the augmented reality controlling apparatus 200 is arranged outside the image display device 300, the image display device 300 may be compact and lightweight. In other embodiments, the augmented reality controlling apparatus 200 may be embedded in the vehicle 1000.

The image display device 300 may output a virtual image based on virtual image data. The user 1100 may view a virtual image via the image display device 300. In some embodiments, as illustrated in FIG. 3, the image display device 300 may include an image generator 302 and a display 310. The image generator 302 may receive virtual image data from the augmented reality controlling apparatus 200 to generate a virtual image. The image generator 302 may provide a virtual image to the display 310.

In some embodiments, as illustrated in FIG. 4, the image generator 302 may include a first image generator 302a, a second image generator 302b, and a beam splitter 302c. The first image generator 302a may output first image light IL1 having a first focal length. The second image generator 302b may output second image light IL2 having a second focal length, the second focal length being different from the first focal length. The beam splitter 302*c* may pass the first image light IL1 and reflect the second image light IL2. The beam splitter 302*c* may provide a combination of the first image light IL1 and the second image light IL2 to the display unit 310. As a result, the image display device 300 may output a virtual image having a plurality of focal lengths. Accordingly, the user 1100 may sense multiple depths from the virtual image.

While the image display device 300 is described as including the image generator 302 and the display 310, this is an example. According to necessity, various optical elements may be arranged between the image generator 302 and the display 310. For example, optical elements that extend an optical path may be arranged, thereby allowing the image display device 300 to be compact.

For example, the display 310 may include a see-through type display. A see-through type display may pass an actual image through. Accordingly, the user 1100 may view both a virtual image output on the display 310 and an actual image that passes through the display 310 and reaches the eyes of the user 1100. In some embodiments, the image display device 300 may include a glasses-type device. For example, a pair of displays 310 may be respectively provided at positions of two lenses of glasses. Accordingly, the image display device 300 may provide the user 1100 a wide angle of view.

Hereinafter, a method of implementing an augmented reality, according to some embodiments, will be described.

Referring to FIGS. 2 and 5, the augmented reality controlling apparatus 200 may determine whether a first sensing device 110 is present (S110). For example, the augmented reality controlling apparatus 200 may identify the first sensing device 110 based on a result of determining whether the first sensing device 110 is present. In addition, the augmented reality controlling apparatus may identify the first sensing device 110 based on a type of the first sensing device 110.

In some embodiments, the augmented reality controlling apparatus 200 may include a smartphone. For example, when the user 1100 carrying a smartphone, on which an application for implementation of an augmented reality is executed, gets on a vehicle, the smartphone may identify the first sensing device 110 in the vehicle. For example, a smartphone may receive an identification signal emitted periodically from the first sensing device 110 to identify a type of the first sensing device 110.

When it is determined that there is the first sensing device 110, the first sensing device 110 is controlled by the augmented reality controlling apparatus 200 and may generate sensing data (S120). As described above with reference to FIG. 2, sensing data may be image data about an area including a face of the user 1100. The first sensing device 110 may provide sensing data to the augmented reality controlling apparatus 200.

The augmented reality controlling apparatus 200 may process sensing data by using a data processing method corresponding to the first sensing device 110, which is identified. For example, the augmented reality controlling apparatus 200 may extract information about a position and direction of a face of a user from sensing data. By using sensing data and actual image data, the augmented reality controlling apparatus 200 may generate virtual image data from which a virtual image matching an actual image is generated (S130). The actual image data may be obtained using the external photographing apparatus 400. For example, virtual image data may include direction guide indication information, gas station price information, or warning information. The augmented reality controlling apparatus 200 may match a virtual image to an actual image by using information about a position and direction of a face of the user 1100. A virtual image matched to an actual image may indicate that characteristics of the virtual image are determined to correspond to the actual image. For example, a position of a virtual image (for example, an image of a direction guide indicator, an image of prices of a gas station) may be fixed on an actual image (for example, an image of an actual road, an image of an actual gas station).

Hereinafter, a method of obtaining information about a position and direction of a face of the user 1100 by using the augmented reality controlling apparatus 200 will be described. The augmented reality controlling apparatus 200 may specify a face portion of the user 1100 from sensing data. For example, the augmented reality controlling apparatus 200 may extract feature points of the face from sensing data and match the feature points to a three-dimensional image model about an ordinary face, thereby specifying the face portion of the user 1100. Information about a position and direction of the face of the user 1100 may be obtained in this manner. For example, the augmented reality controlling apparatus 200 may obtain information about six degrees of freedom of a face of the user 1100. The augmented reality controlling apparatus 200 may provide virtual image data to the image display device 300.

The image display device 300 may output a virtual image to the display unit 310 based on the virtual image data (S140). An actual image may pass through the display unit 310 and reach the eyes of the user 1100. The user 1100 may view an image in which an actual image and a virtual image are combined. A virtual image may be matched to an actual image. Characteristics of a virtual image may be determined in accordance with an actual image. For example, a virtual image may be output such that the virtual image is fixed at a particular position of an actual image. For example, when the user 1100 has moved his or her face, an output position of a virtual image on the display 310 may be varied in accordance with a direction of the face of the user 1100. As a virtual image is matched to an actual image, the level of immersion of the user 1100 of the system 11 for implementing an augmented reality may be increased. Hereinafter, a virtual image matched to an actual image will be described.

Referring to FIGS. 6 and 7, an actual image and a virtual image that the user 1100 (of FIG. 2), who is driving the vehicle 1000 (of FIG. 2), sees via the display 310 of the image display device 300 may be provided. An arrow image 312 is a virtual image, and the other images may be actual images. The vehicle 1000 (of FIG. 2) may be driven on a second lane (i.e., center lane in FIGS. 6 and 7). The arrow image 312 may be output over both an image of the second lane and an image of a third lane, thereby guiding the user 1100 (of FIG. 2) to make a lane change.

As illustrated in FIG. 6, when the face of the user 1100 (of FIG. 2) faces a front side of the vehicle 1000 (of FIG. 2), the image of the second lane and the image of the third lane may be respectively arranged in a center portion and a right portion of the display 310. Thus, the arrow image 312 may be output over the center portion and the right portion of the display unit 310.

As illustrated in FIG. 7, when the user 1100 turns his or her head to the right and views the third lane, the image of the second lane and the image of the third lane may be respectively arranged on the left portion and the center portion of the display 310. Accordingly, unlike FIG. 6, the arrow image 312 may be output over the left portion and the center portion of the display 310. That is, an output position of the arrow image 312 may be modified in accordance with a direction of the face of the user 1100 (of FIG. 2).

Referring back to FIGS. 2 and 5, when it is determined that the first sensing device 110 is not present, the augmented reality controlling apparatus 200 may generate virtual image data without using sensing data and actual image data. The image display device 300 may output a virtual image based on virtual image data. The virtual image may be independent of an actual image.

According to the disclosure, the image display device 300 that is compact and lightweight and has a wide angle of view may be provided. According to the disclosure, the system 11 for implementing an augmented reality, providing a high level of immersion and a method of implementing an augmented reality may be provided.

Figure 8:
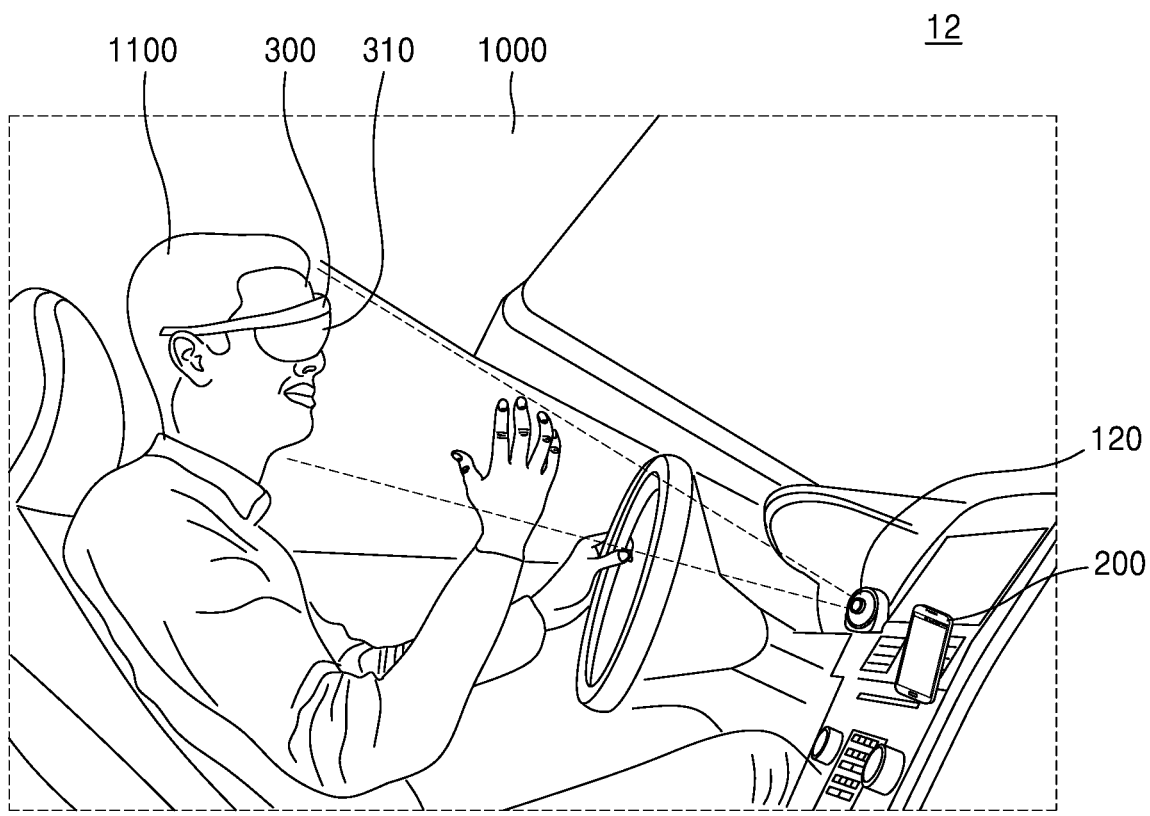
FIG. 8 is a conceptual diagram of a system for implementing an augmented reality, for describing a method of implementing an augmented reality, according to an embodiment.
Figure 9:
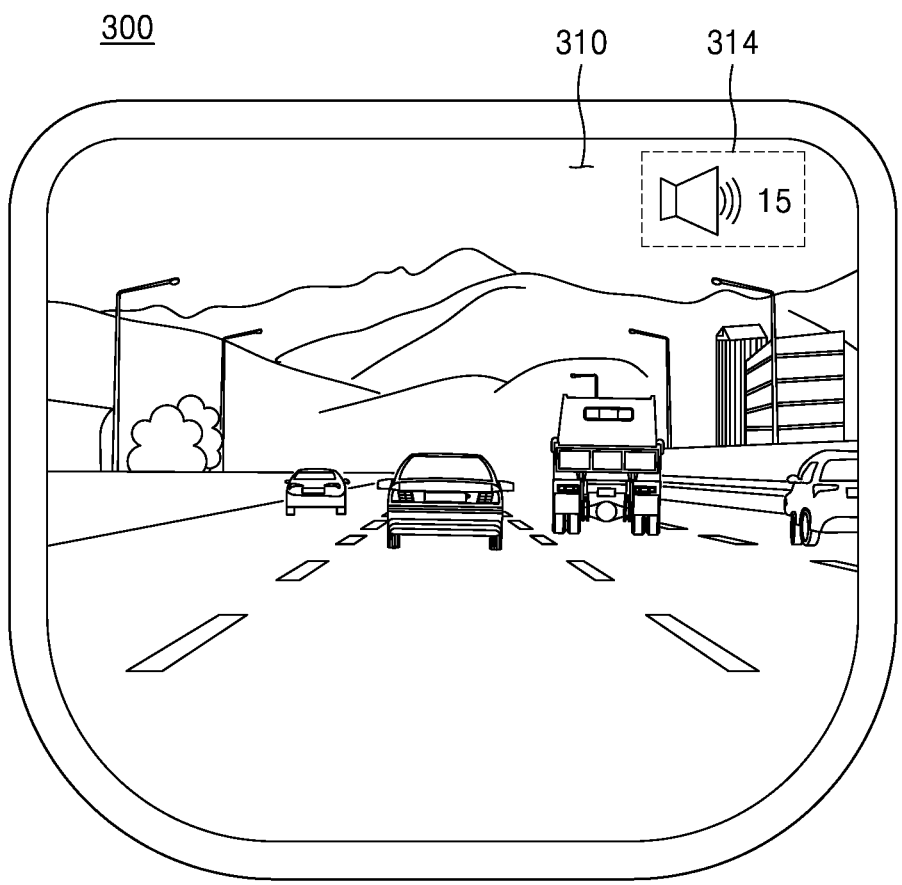
FIGS. 9 and 10 are conceptual diagrams of implementation of an augmented reality, for describing the method of implementing an augmented reality, described with reference to FIG. 8.
Figure 10:
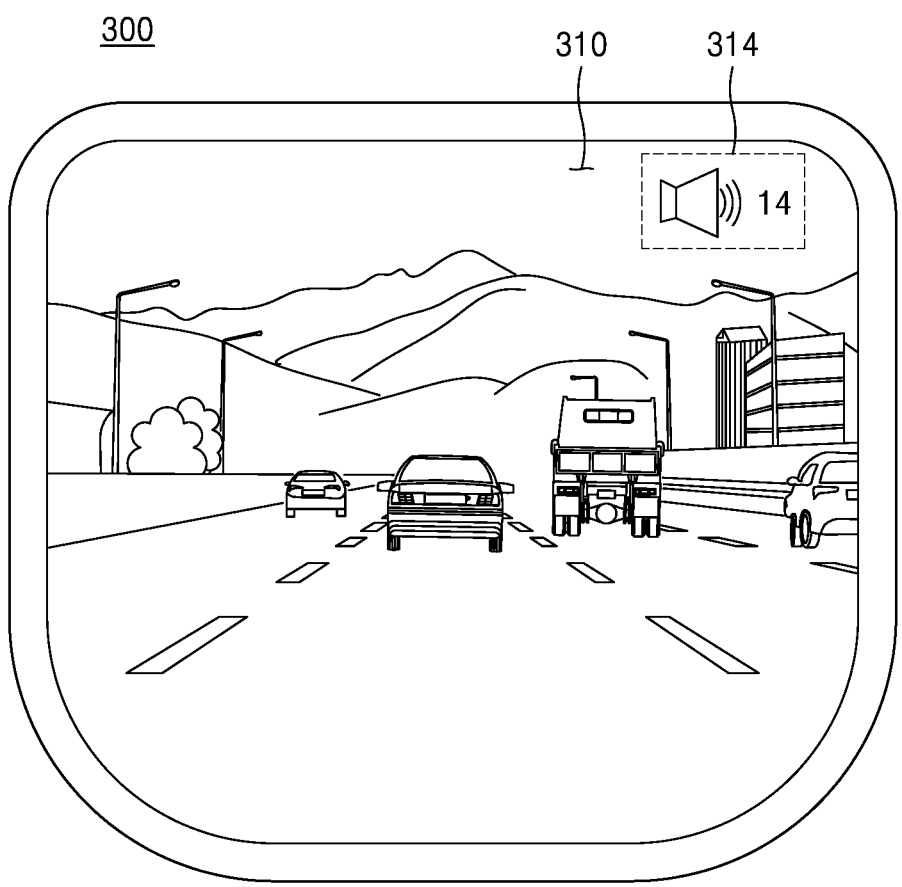

FIG. 8 is a conceptual diagram of a system for implementing an augmented reality, for describing a method of implementing an augmented reality according to an embodiment. FIGS. 9 and 10 are conceptual diagrams of implementation of an augmented reality, for describing the method of implementing an augmented reality, described with reference to FIG. 8. For brevity, descriptions that are substantially identical to those provided with reference to FIGS. 2 through 5 may be omitted.

Referring to FIG. 8, a system 12 for implementing an augmented reality, including a second sensing device 120, an augmented reality controlling apparatus 200, and an image display device 300 in a vehicle 1000 may be provided.

The second sensing device 120 may sense a gesture of the user 1100 of the system 12 for implementing an augmented reality and generate sensing data. For example, the second sensing device 120 may include a gesture sensor. For example, a gesture of the user 1100 may include a hand movement of the user 1100. The second sensing device 120 may provide sensing data to the augmented reality controlling apparatus 200.

The augmented reality controlling apparatus 200 may identify the second sensing device 120 and process sensing data by using a data processing method corresponding to the identified second sensing device 120. For example, the augmented reality controlling apparatus 200 may obtain gesture information of a user from sensing data. The augmented reality controlling apparatus 200 may perform a function of a vehicle by using the obtained gesture information. The function may be preset to correspond to gesture information. The augmented reality controlling apparatus 200 may output a virtual image to the image display device 300 by using the gesture information. For example, a virtual image may indicate an operational state of the function. Hereinafter, the display unit 310 on which a function of a vehicle and a virtual image are output will be described.

Referring to FIGS. 9 and 10, an actual image and a virtual image that the user 1100 (of FIG. 6) views via the display unit 310 of the image display device 300 may be provided. A volume condition image 314 may be a virtual image, and the other images may be actual images. As illustrated in FIG. 9, a volume in the vehicle 1000 (of FIG. 6) is 15, and a speaker shape and '15' may be output at the upper right end of the display unit 310.

As illustrated in FIG. 10, when the user 1100 has performed a hand movement to lower a volume by one level, the volume in the vehicle 1000 is lowered to 14 and the number of the volume condition image 314 output on the display unit 310 may be changed to '14.' Unlike the description provided with reference to FIGS. 2 and 3, the volume condition image 314 (virtual image) may not be matched with a road image (actual image). That is, the volume condition image 314 may be constantly output at the upper right end of the display unit 310, regardless of the road image. While having fixed a viewpoint on the front side of the vehicle, the user 1100 may determine an operational state of a function of the vehicle 1000 (FIG. 6). Accordingly, safety and convenience of the user 1100 during driving may be improved.

According to the disclosure, the image display device 300 that is compact and lightweight and has a wide angle of view may be provided. According to the disclosure, the system 12 for implementing an augmented reality, having improved convenience and driving safety, and a method of implementing an augmented reality may be provided.

Figure 11:
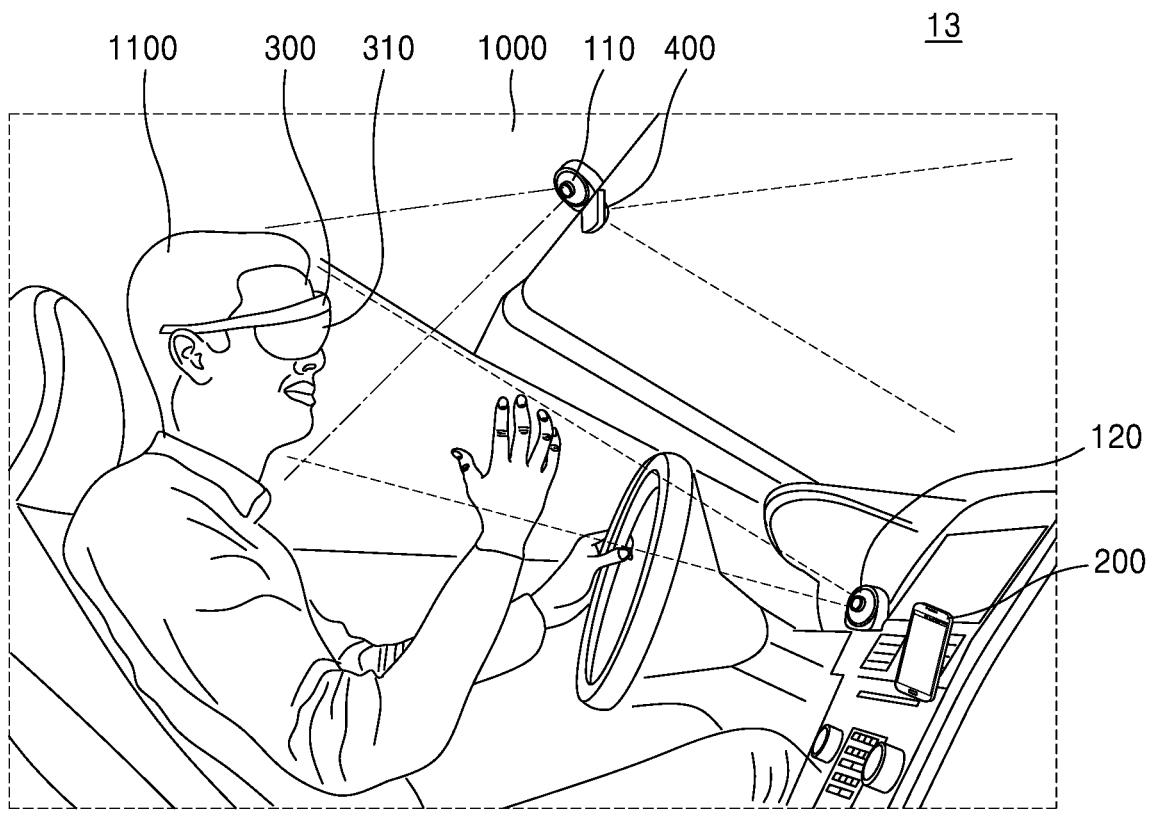
FIG. 11 is a conceptual diagram of a system for implementing an augmented reality, for describing a method of implementing an augmented reality, according to an embodiment.
Figure 12:
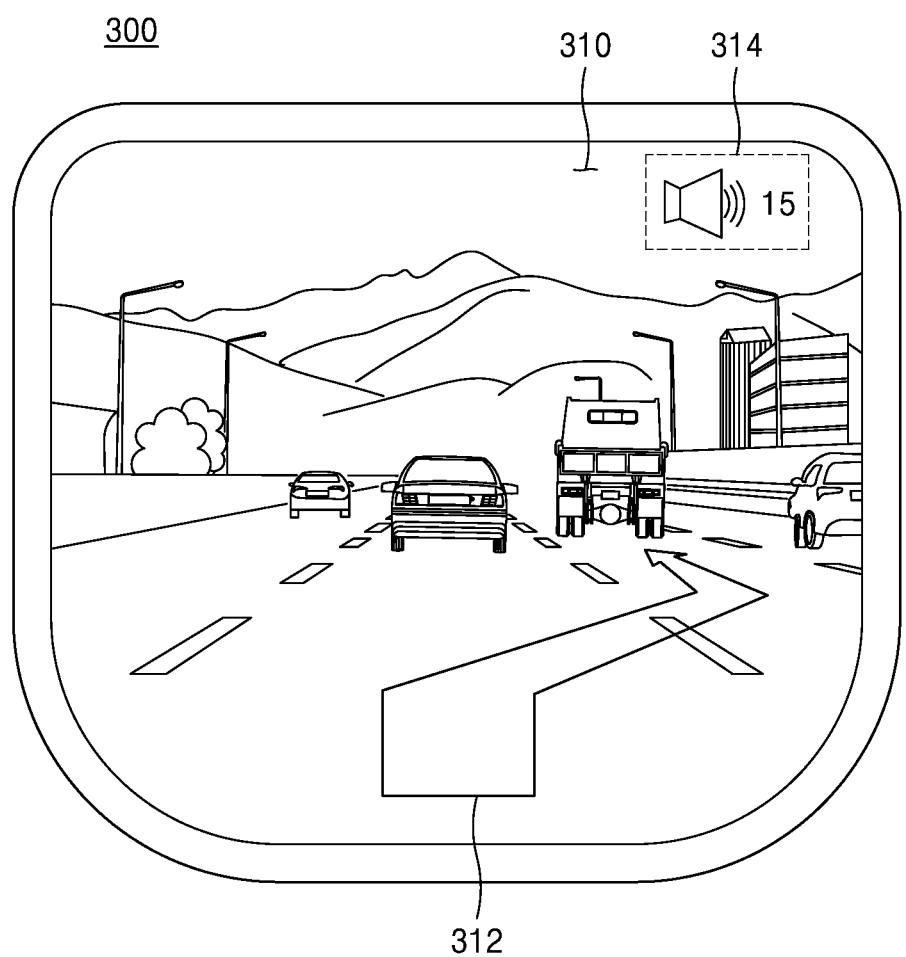
FIGS. 12 and 13 are conceptual diagrams of implementing an augmented reality, for describing the method of implementing an augmented reality, described with reference to FIG. 11.
Figure 13:
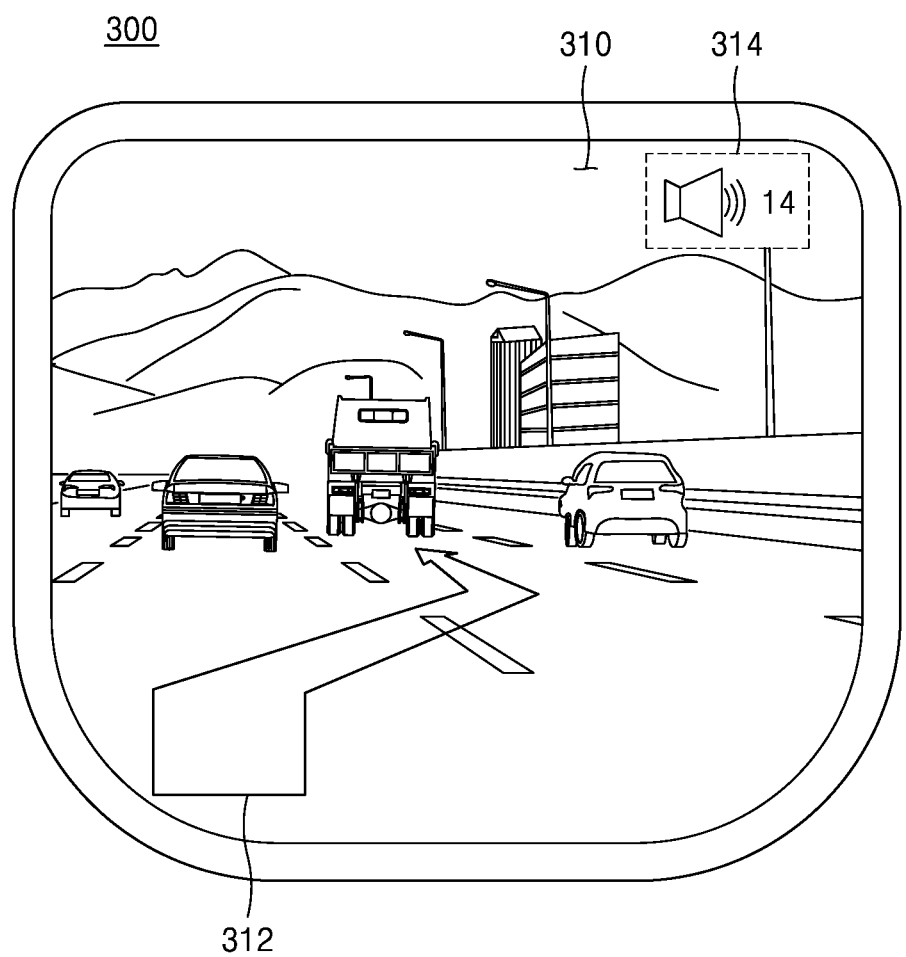

FIG. 11 is a conceptual diagram of a system for implementing an augmented reality, for describing a method of implementing an augmented reality, according to an embodiment. FIGS. 12 and 13 are conceptual diagrams of implementing an augmented reality, for describing the method of implementing an augmented reality, described with reference to FIG. 11. For brevity, descriptions that are substantially identical to those provided with reference to FIGS. 2 through 5 and FIG. 8 are omitted.

Referring to FIG. 11, a system 13 for implementing an augmented reality, including a first sensing device 110, a second sensing device 120, an augmented reality controlling apparatus 200, an image display device 300, and an external photographing apparatus 400 in a vehicle 1000 may be provided. The first sensing device 110 and the external photographing apparatus 400 may be substantially respectively identical to the first sensing device 110 and the external photographing apparatus 400 described with reference to FIG. 2. The second sensing device 120 may be substantially identical to the second sensing device 120 described with reference to FIG. 8.

The augmented reality controlling apparatus 200 may receive first sensing data including information about a face of the user 1100 from the first sensing device 110. The first sensing data may be substantially identical to the sensing data described with reference to FIGS. 2 and 5. The augmented reality controlling apparatus 200 may receive actual image data from the external photographing apparatus 400. The augmented reality controlling apparatus 200 may generate first virtual image data forming a virtual image matched to an actual image, by using the first sensing data and the actual image data. The first virtual image data may be substantially identical to the virtual image data described with reference to FIGS. 2 and 5.

The augmented reality controlling apparatus 200 may receive second sensing data including information about a gesture of the user 1100 from the second sensing device 120. The second sensing data may be substantially identical to the sensing data described with reference to FIG. 8. The augmented reality controlling apparatus 200 may generate second virtual image data from which a virtual image independent of an actual image is formed, by using the second sensing data. The second virtual image data may be substantially identical to the virtual image data described with reference to FIG. 8. The augmented reality controlling apparatus 200 may provide the first and second virtual image data to the image display device 300.

The image display device 300 may generate first and second virtual images based on first and second virtual image data, respectively. The first virtual image may be matched to an actual image. The first virtual image may be substantially identical to the virtual image described with reference to FIGS. 2 and 5. The second virtual image may not be matched to an actual image. That is, the second virtual image may be independent of an actual image. The second virtual image may be substantially identical to the virtual image described with reference to FIG. 8.

According to the disclosure, the image display device 300 that is compact and lightweight and has a wide angle of view may be provided. According to the disclosure, the system 13 for implementing an augmented reality, which provides a high level of immersion and improved convenience and driving safety, and a method of implementing an augmented reality may be provided.

Figure 14:
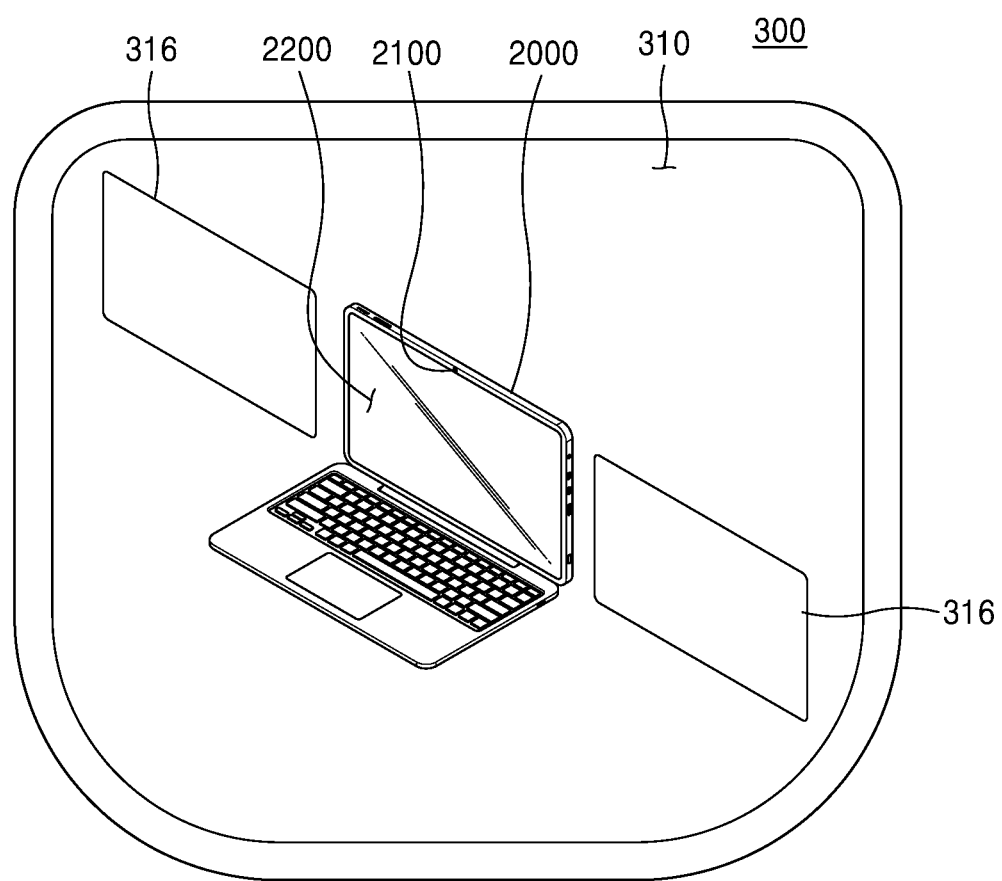
FIG. 14 is a conceptual diagram of implementation of an augmented reality, for describing a method of implementing an augmented reality, according to an embodiment.

FIG. 14 is a conceptual diagram of implementation of an augmented reality, for describing a method of implementing an augmented reality, according to an embodiment. For brevity, descriptions that are substantially identical to those provided with reference to FIGS. 2 and 5 may be omitted.

Referring to FIG. 14, the image display device 300 including the display 310, a laptop computer 2000, and a camera 2100 may be provided. The image display device 300 and the display 310 may be substantially identical to those described with reference to FIGS. 2 and 5.

The laptop computer 2000 and the camera 2100 may respectively correspond to the augmented reality controlling apparatus 200 and the first sensing device 110 described with reference to FIGS. 2 and 5. In some embodiments, the camera 2100 may obtain sensing data by capturing an image of a user (not shown) of the laptop computer 2000. The camera 2100 may provide sensing data to the laptop computer 2000.

The laptop computer 2000 may generate virtual image data about a virtual monitor by using the sensing data. The laptop computer 2000 may provide virtual image data to the image display device 300.

The image display device 300 may output a virtual monitor image 316 on the display 310 based on virtual image data. The virtual monitor image 316 may be matched to an actual image. For example, a position of the virtual monitor image 316 may be fixed on the left and right sides of an actual monitor image 2200. A user may view the virtual monitor image 316 provided on the left and right sides of the actual monitor image 2200.

According to the disclosure, the image display device 300 that is compact and lightweight and has a wide angle of view may be provided. According to the disclosure, a system for implementing an augmented reality, which provides a high level of immersion and improved convenience, and a method of implementing an augmented reality may be provided.

According to the disclosure, an augmented reality controlling apparatus and a method and system for implementing an augmented reality, which provide an improved level of immersion, may be provided. According to the disclosure, an augmented reality controlling apparatus, which provide improved optical characteristics, may be provided. According to the disclosure, an augmented reality controlling apparatus and a method and system for implementing an augmented reality, which provide improved convenience and safety of a user, may be provided. According to the disclosure, an image display device that is compact and lightweight may be provided.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An apparatus for controlling an augmented reality, the apparatus comprising:
   a communicator configured to communicate with an external device and a wearable image display device; and
   a processor configured to:
   identify a first sensing device and a second sensing device external to the apparatus,
   generate virtual image data based on sensing data received, via the communicator, from the identified first sensing device and the second sensing device, wherein the first sensing device is configured to capture an entire face information of a user wearing the wearable image display device on the face and the second sensing device configured to capture gesture information about a gesture of the user,
   receive actual image data, via the communicator, from a photographing device external to the apparatus, and
   provide the virtual image data matching the actual image data to the wearable image display device external to the apparatus, via the communicator,
   wherein the first sensing device, the second sensing device, and the wearable image display device are separate from each other,
   wherein the virtual image data comprises a virtual image to be output on the wearable image display device,
   wherein a position of the virtual image output on the wearable image display device varies based on a movement direction of the face of the user, and
   wherein the wearable image display device is configured to completely cover eyes of the user and the first sensing device is configured to capture both the face of the user and the wearable image display device.

2. The apparatus of claim 1, wherein the processor is further configured to:
   receive an identification signal from the first sensing device via the communicator; and
   identify the first sensing device based on the identification signal.

3. The apparatus of claim 1, wherein the sensing data comprises image data about an area including the face of the user.

4. The apparatus of claim 3, wherein the processor is further configured to extract information about a position and the movement direction of the face of the user from the sensing data.

5. The apparatus of claim 3, wherein the wearable image display device is configured to output a virtual image, and
   the processor is further configured to generate the virtual image data such that the wearable image display device outputs the virtual image matching an actual image,
   wherein the actual image is based on the actual image data received, via the communicator, from the photographing device external to the apparatus.

6. The apparatus of claim 5, wherein the virtual image has a position fixed on the actual image.

7. The apparatus of claim 6, wherein the wearable image display device is configured to output the virtual image, wherein the processor is further configured to:
control a vehicle such that a function corresponding to the gesture is performed, and
generate the virtual image data such that the wearable image display device outputs the virtual image corresponding to the function.

8. The apparatus of claim 7, wherein the virtual image is independent of the actual image.

9. The apparatus of claim 1, wherein the wearable image display device comprises a glasses-type device.

10. The apparatus of claim 1, wherein the wearable image display device is configured to output virtual images located at a plurality of focal lengths.

11. The apparatus of claim 1, wherein the apparatus is a mobile device configured to generate the virtual image data and transmit the virtual image data to the wearable image display device.

12. The apparatus of claim 1, wherein the mobile device is a smartphone or a smart watch.

13. A method of implementing an augmented reality by an augmented reality controlling apparatus, the method comprising:
identifying a first sensing device and a second sensing device external to the augmented reality controlling apparatus;
generating virtual image data based on sensing data received from the identified first sensing device and the second sensing device, wherein the first sensing device is configured to capture an entire face information of a user wearing a wearable image display device on the face and the second sensing device configured to capture gesture information about a gesture of the user;
receiving actual image data from a photographing device external to the augmented reality controlling apparatus; and
providing the virtual image data matching the actual image data to the wearable image display device external to the augmented reality controlling apparatus,
wherein the first sensing device, the second sensing device, the augmented reality controlling apparatus and the wearable image display device are separate from each other,
wherein the virtual image data comprises a virtual image to be output on the wearable image display device,
wherein a position of the virtual image output on the wearable image display device varies based on a movement direction of the face of the user, and
wherein the wearable image display device is configured to completely cover eyes of the user and the first sensing device captures both the face of the user and the wearable image display device.

14. The method of claim 13, wherein the identifying of the first sensing device comprises:
receiving, by using the augmented reality controlling apparatus, an identification signal from the first sensing device; and
identifying the first sensing device based on the identification signal.

15. The method of claim 13, wherein a virtual image corresponding to the virtual image data is matched to an actual image.

16. The method of claim 15, wherein the generating of the virtual image data comprises:
extracting information about a position and the movement direction of the face of the user from the sensing data;
obtaining actual image data; and
matching the virtual image to the actual image based on the information about the position and the direction of the face and the actual image data.

17. The method of claim 13, wherein a virtual image corresponding to the virtual image data is independent of an actual image.

18. The method of claim 17,
wherein the virtual image corresponds to the gesture information.

19. A system for implementing an augmented reality, the system comprising:
a first sensing device and a second sensing device configured to generate sensing data, wherein the first sensing device configured to capture face information of a user and the second sensing device configured to capture gesture information about a gesture of the user;
an external photographing apparatus generating actual image data by capturing an image of an actual object;
an augmented reality controlling apparatus configured to generate virtual image data matching the actual image data by processing the sensing data; and
a wearable image display device configured to output a virtual image based on the virtual image data,
wherein the wearable image display device comprises a glasses-type device,
wherein the external photographing apparatus, the first sensing device and the augmented reality controlling apparatus are external to the wearable image display device,
wherein the first sensing device, the second sensing device, the augmented reality controlling apparatus and the wearable image display device are separate from each other, and
wherein the first sensing device is configured to capture an entire face information of a user wearing the wearable image display device on the face,
wherein the virtual image data comprises a virtual image to be output on the wearable image display device,
wherein a position of the virtual image output on the wearable image display device varies based on a movement direction of the face of the user, and
wherein the wearable image display device is configured to completely cover eyes of the user and the first sensing device is configured to capture both the face of the user and the wearable image display device.

20. The system of claim 19, wherein the augmented reality controlling apparatus comprises a mobile portable device and receives an identification signal from the first sensing device to identify the first sensing device.

21. The system of claim 19, wherein the augmented reality controlling apparatus is embedded in a vehicle.

* * * * *